US011068316B2

(12) United States Patent
Muskal et al.

(10) Patent No.: US 11,068,316 B2
(45) Date of Patent: Jul. 20, 2021

(54) SYSTEMS AND METHOD FOR MANAGING MEMORY RESOURCES USED BY SMART CONTRACTS OF A BLOCKCHAIN

(71) Applicant: LiquidApps Ltd, Tel-Aviv (IL)

(72) Inventors: Tal Muskal, Saratoga, CA (US); Beni Hakak, Ramat-HaSharon (IL); Eyal Hertzog, Ramat-HaSharon (IL); Guy Ben Artzi, Rishpon (IL)

(73) Assignee: LiquidApps Ltd, Tel-Aviv (IL)

( * ) Notice: Subject to any disclaimer, the term of this patent is extended or adjusted under 35 U.S.C. 154(b) by 148 days.

(21) Appl. No.: 16/231,664

(22) Filed: Dec. 24, 2018

(65) Prior Publication Data
US 2020/0201683 A1    Jun. 25, 2020

(51) Int. Cl.
G06F 9/50     (2006.01)
H04L 12/24    (2006.01)
(Continued)

(52) U.S. Cl.
CPC .......... *G06F 9/5077* (2013.01); *G06F 9/5016* (2013.01); *H04L 9/0637* (2013.01);
(Continued)

(58) Field of Classification Search
CPC ... G06F 9/5077; G06F 9/5016; H04L 9/0637; H04L 9/0825; H04L 9/3218;
(Continued)

(56) References Cited
U.S. PATENT DOCUMENTS

2010/0174879 A1* 7/2010 Pawar ................. G06F 3/0631
                                                 711/161
2018/0025167 A1* 1/2018 Bohli ..................... H04L 9/14
                                                 713/193
(Continued)

OTHER PUBLICATIONS

Greesnpan et al. "Scaling blockchains with off-chain data" Jun. 13, 2018, Multichain, pp. 1-12 Online link: "https://www.multichain.com/blog/2018/06/scaling-blockchains-off-chain-data/" (Year: 2018).*
(Continued)

*Primary Examiner* — Meng Ai T An
*Assistant Examiner* — Willy W Huaracha

(57) ABSTRACT

There is provided a system, comprising: a hardware processor(s) executing a code for: receiving a request to identify data for execution of action(s) in a limited allocated memory resource (LAMR) of a blockchain storage system, the LAMR defining storage space for storing data of smart contracts, when the requested data is not found in the LAMR, acquiring a cryptographic proof of the requested data from the LAMR, using the cryptographic proof for acquiring a copy of the requested data from a virtual allocated memory resource (VAMR), storing the copy of the requested data in the LAMR for performing the action(s) by the blockchain storage system using the stored copy, the performance of the action(s) updates the stored copy in the LAMR, replacing the cryptographic proof with a new cryptographic proof created by processing the updated stored copy in the LAMR, and storing the updated stored copy in the VAMR.

28 Claims, 7 Drawing Sheets

(51) Int. Cl.
  *H04L 29/06* (2006.01)
  *H04L 29/08* (2006.01)
  *H04L 9/32* (2006.01)
  *H04L 9/08* (2006.01)
  *H04L 9/06* (2006.01)

(52) U.S. Cl.
  CPC .......... *H04L 9/0825* (2013.01); *H04L 9/3218* (2013.01); *H04L 9/3247* (2013.01); *H04L 41/145* (2013.01); *H04L 41/5038* (2013.01); *H04L 63/108* (2013.01); *H04L 63/123* (2013.01); *H04L 67/2842* (2013.01); *H04L 2209/38* (2013.01)

(58) Field of Classification Search
  CPC . H04L 9/3247; H04L 41/145; H04L 41/5038; H04L 63/123; H04L 67/2842; H04L 2209/38
  See application file for complete search history.

(56) References Cited

U.S. PATENT DOCUMENTS

| | | |
|---|---|---|
| 2018/0191503 A1 | 7/2018 | Alwar et al. |
| 2018/0247191 A1 | 8/2018 | Katz et al. |
| 2019/0065788 A1* | 2/2019 | Vijayasankar ...... H04L 63/0428 |
| 2019/0158470 A1* | 5/2019 | Wright ................ H04W 12/001 |
| 2019/0236286 A1* | 8/2019 | Scriber .................... G06F 21/33 |
| 2019/0279206 A1* | 9/2019 | Song .................... G06F 16/1834 |
| 2020/0104307 A1* | 4/2020 | Keskar .................... G06F 16/21 |
| 2020/0110811 A1* | 4/2020 | Kamijoh ................ H04L 63/126 |
| 2020/0110813 A1* | 4/2020 | Kamijoh ................. G06F 16/23 |
| 2020/0118117 A1* | 4/2020 | McManus ............ G06Q 10/087 |

OTHER PUBLICATIONS

International Search Report and the Written Opinion dated Apr. 24, 2020 From the International Searching Authority Re. Application No. PCT/IL2019/051399.

* cited by examiner

SYSTEMS AND METHOD FOR MANAGING MEMORY RESOURCES USED BY SMART CONTRACTS OF A BLOCKCHAIN

FIELD AND BACKGROUND OF THE INVENTION

The present invention, in some embodiments thereof, relates to blockchains and, more specifically, but not exclusively, to systems and methods or management of memory resources used by blockchain storage system.

Blockchains are undergoing rapid technological improvements. New blockchain technologies are being designed to provide a decentralized platform for supporting decentralized applications. The new blockchain technologies seek to improve the performance of the decentralized applications, for example, in terms of the number of transactions that may be executed per second.

SUMMARY OF THE INVENTION

According to a first aspect, a system for managing a limited allocated memory resource (LAMR) storing data used by smart contract code of a LAMR based blockchain dataset, comprises: at least one hardware processor executing a code for: receiving a request to identify data for execution of at least one action in a LAMR of a blockchain storage system, the LAMR defining storage space for storing data of each of a plurality of smart contracts stored in the blockchain storage system, when the requested data is not found in the LAMR, acquiring a cryptographic proof of the requested data from the LAMR, using the cryptographic proof for acquiring a copy of the requested data from a virtual allocated memory resource (VAMR), storing the copy of the requested data in the LAMR for performing the at least one action by the blockchain storage system using the stored copy, the performance of the at least one action updates the stored copy in the LAMR, replacing the cryptographic proof with a new cryptographic proof created by processing the updated stored copy in the LAMR, and storing the updated stored copy in the VAMR.

According to a second aspect, a computer implemented method for managing a limited allocated memory resource (LAMR) storing data used by smart contract code of a LAMR based blockchain dataset, comprises: receiving a request to identify data for execution of at least one action in a LAMR of a blockchain storage system, the LAMR defining storage space for storing data for each of a plurality of smart contracts stored in the blockchain storage system, when the requested data is not found in the LAMR, acquiring a cryptographic proof of the requested data from the LAMR, using the cryptographic proof for acquiring a copy of the requested data from a virtual allocated memory resource (VAMR), storing the copy of the requested data in the LAMR for performing the at least one action by the blockchain storage system using the stored copy, the performance of the at least one action updates the stored copy in the LAMR, replacing the cryptographic proof with a new cryptographic proof created by processing the updated stored copy in the LAMR, and storing the updated stored copy in the VAMR.

According to a third aspect, a computer program product for managing a limited allocated memory resource (LAMR) storing data used by smart contract code of a LAMR based blockchain dataset comprises: a non-transitory memory stored thereon code for execution by at least one hardware process, the code including instructions for: receiving a request to identify data for execution of at least one action in a LAMR of a blockchain storage system, the LAMR defining storage space for storing data for each of a plurality of smart contracts stored in the blockchain storage system, when the requested data is not found in the LAMR, acquiring a cryptographic proof of the requested data from the LAMR, using the cryptographic proof for acquiring a copy of the requested data from a virtual allocated memory resource (VAMR), storing the copy of the requested data in the LAMR for performing the at least one action by the blockchain storage system using the stored copy, the performance of the at least one action updates the stored copy in the LAMR, replacing the cryptographic proof with a new cryptographic proof created by processing the updated stored copy in the LAMR, and storing the updated stored copy in the VAMR.

In a further implementation form of the first, second, and third aspects, the at least one action is received from a client terminal by gateway service node that simulated the at least one action for identifying that the data for execution of the at least one action is not available, and wherein the request to identify data for execution of the at least one action is generated according to the simulation.

In a further implementation form of the first, second, and third aspects, the at least one action is simulated by running the smart contract of the blockchain associated with the at least one action and that stores data on the VAMR.

In a further implementation form of the first, second, and third aspects, the system further comprises code instructions for and/or the method further comprises and/or the computer program product further comprises additional instructions for transmitting a request to a gateway service node, by the smart contract code of the LAMR, to obtain at least one new data element, wherein the gateway service node requests the at least one new data element from a plurality of external servers, wherein each of the plurality of external servers independently obtains a respective at least one new data element, and signs the respective at least one new data element with a respective private key of the respective external server to create a respective signature, when a consensus of a predefined number of the plurality of external servers obtaining a same value for the respective at least one new data element is reached, the at least one new data element and associated signature of each of the external servers of the consensus is provided to the smart contract of the LAMR, and further comprising: verifying the consensus and associated signatures by the smart contract of the LAMR.

In a further implementation form of the first, second, and third aspects, the request to obtain the at least one new data element is triggered by the performance of the at least one action, wherein the at least one new data element updates the stored copy in the LAMR.

In a further implementation form of the first, second, and third aspects, the system further comprises code instructions for and/or the method further comprises and/or the computer program product further comprises additional instructions for replacing the cryptographic proof with a new cryptographic proof created by processing the stored copy updated with the at least one data element stored in the LAMR, and storing the copy updated with the at least one new data element in the VAMR.

In a further implementation form of the first, second, and third aspects, the at least new data element is at least one member selected from the group consisting of: data that varies with time, a random number, a data element randomly selected from a set of data elements, and data obtained from another blockchain dataset.

In a further implementation form of the first, second, and third aspects, the system further comprises code instructions for and/or the method further comprises and/or the computer program product further comprises additional instructions for transmitting a request to a gateway service node, by the smart contract code of the LAMR, to perform an external service on an external server, and wherein the gateway service node generates instructions for execution of the request to perform the external service on the external server.

In a further implementation form of the first, second, and third aspects, the at least one action is performed by the blockchain storage system using the copy stored in the LAMR independently of execution of the request to perform the external service by the gateway service node.

In a further implementation form of the first, second, and third aspects, the system further comprises code instructions for and/or the method further comprises and/or the computer program product further comprises additional instructions for at least one of flagging for overwrite and deleting the updated copy of the requested data stored in the LAMR, after storing the updated stored copy in the VAMR.

In a further implementation form of the first, second, and third aspects, the at least one of flagging for overwrite and deleting is performed after a predefined time interval has elapsed without receiving another request for identifying the updated copy of the requested data stored in the LAMR for execution of another at least one action.

In a further implementation form of the first, second, and third aspects, the blockchain storage system defines the LAMR as having a predefined fixed amount of global memory resources for use by all smart contract codes stored on the blockchain storage system.

In a further implementation form of the first, second, and third aspects, the VAMR is expandable by inclusion of additional storage devices.

In a further implementation form of the first, second, and third aspects, the VAMR is implemented as off-line storage.

In a further implementation form of the first, second, and third aspects, the VAMR is implemented as virtual storage distributed across a plurality of network connected storage devices.

In a further implementation form of the first, second, and third aspects, the cryptographic proof is stored in a cryptographic signature repository stored on the LAMR, the cryptographic signature repository stores a cryptographic signature computed for each of a plurality of data for execution of at least one action by the blockchain storage system.

In a further implementation form of the first, second, and third aspects, the request is received from a server over a network, the server creates the request in response to instructions received via a software interface from a distributed application (dApp) associated with the blockchain storage system accessed by a network connected client terminal.

In a further implementation form of the first, second, and third aspects, the data for execution of the at least one action is selected from the group consisting of: code components of a smart contract code stored on the blockchain storage system, a temporary cache used by the blockchain storage system for reading data and writing new data, cryptographic keys, states of the smart contract, state of a dApp, network addresses, and account information of users of a dApp associated with the blockchain storage system.

In a further implementation form of the first, second, and third aspects, the data is for execution of at least one action by a smart contract code stored on the blockchain storage system.

In a further implementation form of the first, second, and third aspects, the cryptographic proof is validated against a cryptographic signature of the requested data stored on the VAMR for acquiring the copy of the requested data from the VAMR.

In a further implementation form of the first, second, and third aspects, the system further comprises code instructions for and/or the method further comprises and/or the computer program product further comprises additional instructions for a VAMR token storage dataset storing an amount of VAMR tokens in association with the blockchain storage system, the VAMR tokens defining an amount of storage space of the VAMR available to the blockchain storage system.

In a further implementation form of the first, second, and third aspects, the VAMR tokens define the amount of storage space available to each smart contract of a plurality of smart contracts stored on the blockchain storage system for storage of data for execution of at least one action and for storing the updated stored copy.

In a further implementation form of the first, second, and third aspects, the system further comprises code instructions for and/or the method further comprises and/or the computer program product further comprises additional instructions for storing the new cryptographic proof in the VAMR in association with the updated stored copy stored in the VAMR.

In a further implementation form of the first, second, and third aspects, the updated stored copy and new cryptographic proof are added as a new block of the blockchain storage system, and distributing an indication of the new block over the network to other nodes hosting the blockchain storage system for local update of respective locally stored copies of the blockchain storage system.

In a further implementation form of the first, second, and third aspects, the at least one action comprises a transaction, and the updated stored copy comprises a record of the transaction including details of the transaction.

In a further implementation form of the first, second, and third aspects, the system further comprises code instructions for and/or the method further comprises and/or the computer program product further comprises additional instructions for computing an amount of storage space required for storing the data for execution of at least one action in the LAMR, identifying at least one of: an amount of vacant space in the LAMR, and the amount of storage space of the LAMR associated with a flag indicative of overwrite permission, and copying the data for execution of at least one action to at least one of the vacant space and overwriting existing data of the LAMR associated with the flag indicative of overwrite permission.

In a further implementation form of the first, second, and third aspects, the system further comprises code instructions for and/or the method further comprises and/or the computer program product further comprises additional instructions for providing to a server over a network, an indication of successful execution of the at least one action and successful update of the stored copy.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
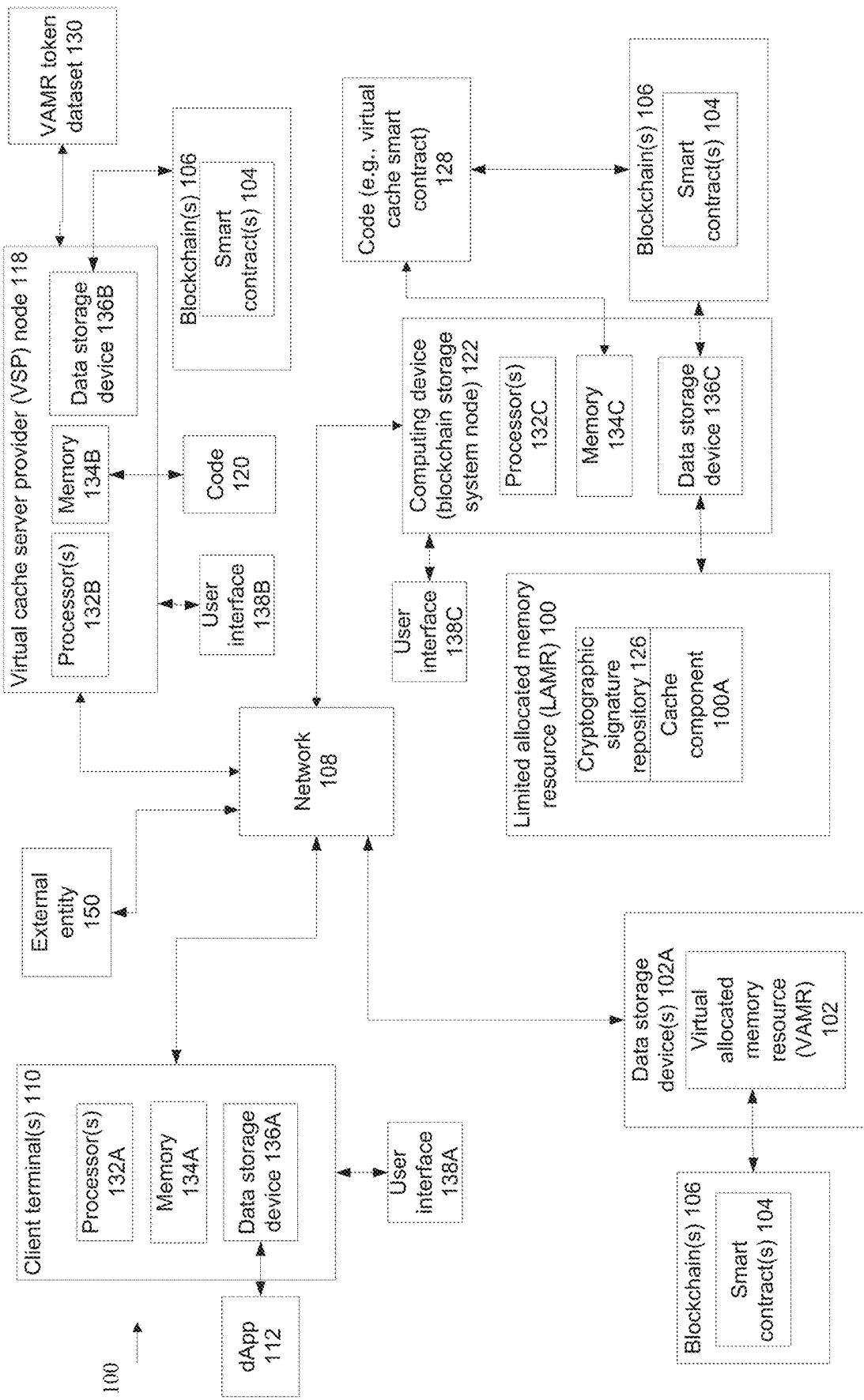
FIG. 1 is a schematic of components of a system for managing a LAMR by loading thereon data stored in a VAMR, the data used by a blockchain storage system for execution of at least one action, in accordance with some embodiments of the present invention.

The present invention, in some embodiments thereof, relates to blockchains and, more specifically, but not exclusively, to systems and methods or management of memory used by a blockchain storage system.

As used herein, the term blockchain storage system may sometimes refer to the smart contract code stored on the blockchain storage system. The term blockchain storage system may sometimes be interchanged with the term smart contract code stored on the blockchain storage system.

An aspect of some embodiments of the present invention relates to systems, methods, an apparatus, and/or code instructions (i.e., stored on a memory and executable by hardware processor(s)) for managing a limited allocated memory resource (LAMR) that stores data used by smart contract code of a LAMR based blockchain dataset, for example, RAM defined by the EOS blockchain platform.

The LAMR defines storage space for storing data of each of the smart contracts stored in the LAMR blockchain storage system. Conceptually, the LAMR is treated as a cache, temporarily storing data used by the smart contract code, optionally for performing an action requested by a client terminal, for example, a distributed application (dApp) accessing the smart contract code. The data may be loaded from a virtual allocated memory resource (VAMR) to the LAMR. In some implementations, the data may be loaded from an external service (e.g., server, process, computing device) to the LAMR, optionally modified, and stored in the VAMR for long term storage.

The VAMR provides permanent and/or long term storage, optionally off-line. The VAMR is expandable by inclusion of additional data storage devices, providing a potentially very large storage capacity. Once the data on the LAMR has been used by the smart contract code, the data may be removed from the LAMR. The storage space freed up on the LAMR by the removal of the data is available for use by other smart contract codes and/or by the same smart contract code for performing other actions. The storage capacity of the LAMR, which is traditional limited and fixed to a defined size, is conceptually greatly expanded by the re-use of the storage space for different smart contracts and/or different actions, and by the VAMR that provides a potentially extremely large (potentially infinite) off-line permanent storage space.

A request is received to identify data for execution of action(s) in the LAMR of the blockchain storage system. When the requested data is not found in the LAMR, a cryptographic proof of the requested data is acquired from the LAMR. The cryptographic proof is used for acquiring a copy of the requested data from the VAMR. The copy of the requested data obtained from the VAMR is stored in the LAMR. The action(s) are performed by the blockchain storage system (i.e., by the smart contract code) using the copy stored on the LAMR.

Optionally, the performance of the action(s) updates the copy stored in the LAMR. The cryptographic proof is replaced with a new cryptographic proof created by processing the updated copy stored in the LAMR. The updated copy is stored in the VAMR.

The storage space in the LAMR used to store the copy of data obtained from the VAMR and/or the updated copy of the data (which has been copied to the VAMR) is freed up for use for storing other data, for use for performing other actions and/or for use by other smart contracts.

Optionally, a gateway service node (also referred to herein as a virtual cache server provider (VSP) node (e.g., server) acts as a proxy to the blockchain storage system. Messages transmitted to the blockchain storage system (e.g., actions for execution by the smart contract code) by client terminals and/or dApps, are instead received by the gateway service node. The gateway service node communicates with the blockchain storage system.

Optionally, the received request to perform the action(s) by the smart contract code are simulated by the gateway service node. The simulation identifies whether the smart contract code requires data for performing the action, and/or which data is required to perform the action. The action is simulated by running the smart contract of the blockchain associated with the action and that stores data on the VAMR. The required data may be stored on the LAMR, on the VAMR (i.e., not presently stored on the LAMR), and/or obtained from an external source (e.g., external server, external process, and/or external computing device).

When the simulation identifies that the smart contract code requires data for performing the action, the gateway service node sends the request to the blockchain storage system to determine whether the required data is currently stored on the LAMR. When the data is not found, the required data is loaded from the VAMR and/or obtained from an external server, and copied to the LAMR for use by the smart contract code for performing the action, as described herein.

Optionally, the gateway service node provides new data elements to the smart contract, obtained from external servers (and/or external processes and/or external computing devices). The new data may be required for performing the action by the smart contract. The new data elements may be, for example, dynamic data elements (e.g., that vary with time, such as real time FIAT currency exchange values, and population of cities), random numbers, and data stored on another blockchain. The new data elements may be obtained from multiple different external entities, where each entity encrypts the data using its own private key to compute a signature. A consensus may be obtained, for example, that at least a certain percentage of the entities provided the same value. The smart contract may verify the new data, by checking that the values provided by the multiple entities are the same. The new data may be saved to the LAMR and/or modify the data on the LAMR, and copied to the VAMR for long term storage.

At least some of the systems, methods, apparatus and/or code instructions described herein address the technical problem of managing a limited allocated memory resource (LAMR) used by a blockchain storage system, optionally smart contracts stored on a LAMR based blockchain storage system, optionally including dApps that use the smart contracts. The LAMR is used by the blockchain storage system (optionally by the smart contracts stored therein) for execution of one or more actions, for example, for execution of action such as transactions, for temporarily storing data, for long term storage of data (e.g., user account information), and/or for storing code of the smart contract for execution. Recent improvement in blockchain technology (e.g., the EOS blockchain that defines RAM for use by the smart contracts) provide large improvements in processing capabilities granted to smart contracts and/or dApps. Improvements include the ability to process a very large number of transactions per second, in comparison to earlier blockchain technologies.

However, the potential growth of blockchain technologies is limited by the amount of memory resources that are available for use by blockchain storage system (optionally the smart contracts and/or dApps) to store data. The amount of memory resource may be a predefined global amount, which cannot be increased. For example, RAM on the EOS blockchain is capped at 64 gigabytes (Gb). The finite memory resources are designated for dedicated use by the blockchain storage system (optionally by the smart contracts stored therein). Remaining finite memory resource becomes increasingly scarce as additional smart contracts acquire rights to use it. The cost of remaining finite memory resources is increased as the supply decreases and demand increases.

Such resources memory are referred to as RAM in the EOS blockchain. In order to develop a dApp on certain blockchains (e.g., EOS blockchain), the dApp develops are required to obtain their own dedicated amount of memory (e.g., EOS RAM). Memory is a limited resource, limited by the availability of physical storage devices designated for storage of data used by smart contracts. As additional dApps are developed and deployed, the amount of remaining memory is reduced. The remaining memory becomes expensive, limiting the number of smart contracts and/or dApps being developed and deployed, and/or limiting the capabilities of the smart contracts and/or dApps being developed. For example, EOS RAM is limited to 64 Gb. The availability of the memory for storage of data by the smart contracts of the dApps hinders the growth, and scalability of the blockchain, and hinders development of complex dApps and/or a larger number of dApps.

At least some of the systems, methods, apparatus and/or code instructions described herein provide a technical solution to the above mentioned technical problem, and/or improve the technology of management of limited memory resources referred to as LAMR (e.g., EOS RAM) used by blockchain storage system (optionally by the smart contracts and/or dApps stored therein). The VAMR described herein provides a virtually infinite amount of storage space for storage of the data used by the blockchain storage system (optionally the smart contracts of the dApps stored therein). The data used by the blockchain storage system (optionally the smart contracts) is kept in long term storage in the VRAM as opposed to current standard practice of storing such data in the LAMR. Long term storage of the data used by the blockchain storage system (optionally the smart contracts) in the VRAM rather than the LAMR frees up available memory space in the LAMR for user by other users of the blockchain storage system (optionally by other smart contracts stored on the blockchain storage system).

The data used by the blockchain storage system (optionally the smart contracts) is loaded from the VRAM into the LAMR on an as-needed basis for real time execution of actions by the blockchain storage system (optionally the smart contract). Once the data has been accessed for execution of the actions, the data is removed from the LAMR. The freed up space of the LAMR may be re-used by another smart contract. In this manner, the same limited amount of space of the LAMR may be iteratively re-used by different users of the blockchain storage system (e.g., different smart contracts) on as add-needed basis, thereby greatly increasing the number of users using the LAMR and/or increasing the number of smart contracts using the LAMR and/or increasing the available amount of data of the LAMR that may be used by each user of the blockchain and/or each smart contract stored on the blockchain. The increase in space of the LAMR is a virtual increase using the same limited amount of available LAMR without necessarily adding additional storage devices.

The VAMR, which may be implemented by distributed storage devices including off-line storage, may be greatly expanded (by adding ever increasing storage devices), provides potentially unlimited amounts of storage space for storing of data used by the smart contract.

The VAMR described herein reduces costs of obtaining LAMR (e.g., EOS RAM) for deployment of dApps, since the VAMR greatly increases the supply of memory resources, which may be increased to match increasing demand for the memory resources The VAMR may be decentralized. The VAMR provides off-blockchain processing, with on blockchain integrity and/or security. The VAMR severs the connection (required by other blockchains such as EOS) between the cost of LAMR (e.g., EOS memory) and the size of the smart contract which is being stored, by using the VAMR.

Currently, dApp developers are being thwarted in their efforts to build on exiting blockchains (e.g., EOS) because they struggle and can't afford to pay the steep LAMR (e.g., EOS RAM) costs and/or because their dApps require an amount of LAMR that far exceeds the current supply. The VAMR, which may be a complement to LAMR, allows the dApp developers to unleash their full potential, dreaming up dApps that could never have existed within the constraints imposed by current LAMR based blockchain technologies. For example, a decentralized social network app (e.g., Facebook) that gives the user back the power to control their data. Such decentralized social network may enables every user to have their own customized version on the blockchain without fear of data leakage or malicious intent. Even if a developer attempted to deploy such a decentralized social network on an existing LAMR based blockchain platform (e.g. EOS), the developer would be unable or severely limited because of the described LAMR constraints. For example, the amount of data stored by the social network is very large when there are many users each storing their own data, making it impractical to store such application on the LAMR. However, such social network application may be stored on the VAMR. In order to execute actions by the social network, the required data is temporarily loaded to the LAMR, and then is freed up for use by other actions of the social network and/or other dApps. When the VAMR described herein is implemented in at least some of the systems, methods, apparatus and/or code instructions described herein, a decentralized social network or a decentralized ride sharing application (e.g., Uber) may be successfully and/or efficiently deployed.

The gateway service node (i.e., VSP node) described herein enables use of the existing LAMR of the blockchain as a cache, where data is stored in the VAMR for long term storage, as described herein. The gateway service node acts as a proxy to client terminals and/or dApps sending instructions to the blockchain storage system, rather than the client terminals and/or dApps directly sending the instructions to the blockchain storage system. The gateway service node analyzes the instructions prior to sending instructions to the blockchain storage system. The gateway service node may simulate execution of the instructions to determine whether data is required by the smart contract code for execution of the action. When data is required, the gateway service node sends the request to determine if the data is currently available on the LAMR. When the data is not found on the LAMR, the data is obtained from the VAMR and/or from an external source, as described herein.

At least some of the systems, methods, apparatus and/or code instructions described herein address the technical problem of a smart contract code obtaining data from an external source, in particular, the smart contract code obtaining dynamic data (e.g., that varies with time) and/or obtaining indeterminate data (e.g., random number). Traditional blockchain architectures cannot process such new data, since blockchains are designed to be deterministic and visible to all, use of data that is not known in advance (e.g., dynamic, non-deterministic) is problematic. Although some workarounds may be available, such workarounds are generally ineffective, and/or add increasing complexity to the blockchain architecture.

The gateway service node (i.e., VSP node) described herein, in combination with the VAMR, enables use of external data by the smart contract code. As described herein in additional detail, the gateway service node performs the functions of obtaining the new data from multiple sources including cryptographic signatures, optionally determines a consensus that the data provided by multiple sources is the same, and provides the multiple copies of the new data elements and signatures to the smart contract for validation. The smart contract uses the new data element to modify the data on the LAMR, which is then written to the VAMR. The dynamic nature of data stored on the LAMR (i.e., which is constantly being written and removed) enables use of such new data elements. The data on the LAMR may be dynamic, before being written in a static manner to the VAMR, and permanently added to the blockchain. In contrast, existing blockchain technologies do not have a dynamic memory component where data may be added and removed, only using static data, prohibiting their smart contracts from using external new data.

The technical problem addressed by at least some of the systems, methods, apparatus and/or code instructions described herein is new, and specific for the technological context of blockchain datasets, in particular to LAMR based blockchain datasets. The technical problem related to management of LAMR for storage of data used by smart contracts stored on the LAMR based blockchain dataset arose only recently due to the technology of LAMR based blockchain datasets, and does not have a counterpart in the old physical world.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the terms smart contract code and smart contract are interchangeable.

Reference is now made to FIG. 1, which is a schematic of components of a system 100 for managing a LAMR 100 by loading thereon data stored in a VAMR 102, the data used by a blockchain storage system 122, optionally a smart contract 104 associated with a blockchain 106, for execution of at least one action, in accordance with some embodiments of the present invention. Components of system 100 may implement the acts of the method described with reference to FIGS. 2-7, by code instructions stored in a memory, executed by one or more hardware processors of one or more devices.

LAMR 100 includes a cache component 100A for temporarily storing data used by blockchain storage system 122, optionally by the smart contract code 104 stored in blockchain 102. The data is loaded into LAMR 100 from VAMR 102, as described herein. LAMR 100 may include a cryptographic signature repository 126, for storing computed cryptographic signatures of the smart contract codes 104 stored in VAMR 102 and/or for storing computed cryptographic signatures of the data or execution of action(s) by the blockchain storage system 122. The cryptographic signatures may be used to validate the data used by the blockchain storage system 122 (optionally the smart contract code 104) before loading the data into cache component 100A of LAMR 100.

It is noted that cache component 100A may not necessarily be explicitly defined, but may be an implicit component defined by the portion of LAMR 100 not taken up by the storage of cryptographic signature repository 126.

LAMR 100 may be stored on one or more data storage devices 136C of nodes 122 of the blockchain storage system. LAMR 100 may be defined by a traditional LAMR based blockchain 106 protocol, for example, EOS RAM of the EOS blockchain.

System 100 includes the following devices in communication with one another over a network 108:

* Data storage device(s) 102A, which store VAMR 102. Data storage device(s) 102A may be implemented as one or more of: storage servers, cloud based storage, virtual storage, off-line storage, memory (e.g., RAM), and/or storage devices of computing devices such as servers and client terminals. Data storage device(s) 102A may be independent storage devices and/or a group of connected storage devices.

Data storage device(s) 102A may be implemented as distributed storage across multiple network connected storage devices.

* Client terminal 110, which stores code of a dApp 112 that communicates with blockchain storage system 122, optionally with smart contract 104 of blockchain 106. A front end portion of dApp 112 may be implemented, for example, as a graphic user interface (GUI) presented on a user interface 138A of client terminal 110. A back end portion of dApp 112 is implemented as smart contract code 104. dApp 112 issues instructions for execution of action(s) by smart contract code 104, for example, a transaction. The instructions or execution of action(s) by smart contract 104 may be provided to a software interface (not shown in FIG. 1) of one or more VAMR service provider (VSP) nodes 118 over network 108. There may be multiple client terminals 110. One is shown for simplicity and clarity of explanation.

* VSP node(s) 118 (also referred to herein as gateway service nodes) stores software interface, which provides an interface for communication with client terminal(s) 110, for example, by acting as a proxy to the blockchain node. Software interface receives instructions for execution of action(s) by smart contract code 104 from dApp 112 (e.g., transaction) executed by client terminal 110, and optionally transmits data to dApp 112, for example, an indication of the transaction result. VSP node 118 may simulate the execution of the action(s) by the smart contract code, as described herein in additional detail. VSP node 118 may receive instructions from smart contract code 104 executed by blockchain storage node 122 for obtaining data from external entity 150 and/or for triggering actions to be executed by external entity 150, as described herein. Software interface makes the relevant data accessible to smart contract 104 before executing an action. Software interface may be implemented as, for example, an application programming interface (API), and/or software development kit (SDK). When implemented in an EOS blockchain platform, software interface may include an EOSIO API service.

Multiple VSP 118 nodes may be implemented. VSP nodes 118 provide redundant and/or trustless sources of data in system 100. VSP nodes 118 may store a local copy of blockchain 106, including smart contract 104. Alternatively, some or all VSP nodes 118 may not store the local copy of blockchain 106. VSP 118 includes code instructions for implementing one or more functions described herein, including providing instructions to one or more computing devices 122, also referred to herein as blockchain nodes. There may be multiple VSP nodes 118. One is shown for simplicity and clarity of explanation.

Multiple architectures of VSP node 118 may be implemented. For example, VSP node 118 is distinct from blockchain storage node 122, i.e., independent and/or external machines. In another architecture, VSP node 118 and blockchain storage node 122 may each be running on a virtual server, and are virtually distinct from one another, although they may be executed by the same hypervisor. In yet another architecture, VSP node 118 and blockchain storage node 122 are executed on the same machine, for example, using different processes (e.g., code).

* One or more external entities 150, for example, a server, a process, a computing device. External entities 150 provide new data to the smart contract (e.g., via VSP node 118), as described herein. External entities 150 may execute instructions provided by the smart contract (e.g., via VSP node 118) which may not necessarily require providing the smart contract with any feedback and/or data, as described herein

* Computing device(s) 122, also referred to as blockchain storage system 122, or blockchain storage system node 122 or blockchain node 122. Each blockchain storage system node 122 stores a local copy of blockchain 106, including smart contract 104. Computing devices 122 may provide data storage device(s) 102A used to host VAMR 102. Blockchain storage system nodes 122 may perform mining of new blocks and/or locally update their respective copies of the blockchain when an indication of a new block is received, according to the protocol of the blockchain. A data storage portion of a data storage device 136C of each blockchain storage system node 122 may be designated for use as LAMR 100.

Blockchain nodes 122 may each store code 128 for implementing one or more features described herein. Code 128 may be implemented as, for example, as VAMR management smart contract stored on the blockchain 106 platform over which system 100 is executing, for example, in the EOS blockchain. Code 128 may provide secure VAMR read and/or write services for dApps executing over blockchain 106 via smart contracts 104 associated with the dApps. Code 128 may manage the VAMR tokens used to access the VAMR, optionally stored in VAMR token dataset 130.

Optionally, blockchain 106 storing smart contract 104 and the blockchain storing VAMR contract 128 may be the same blockchain. Alternatively, blockchain 106 is a different blockchain than the blockchain storing VAMR contract 128, for example, based on a different architecture and/or different protocol. Such implementation allows for cross-chain compatibility, in which smart contract code 104 executed by blockchain 106, or multiple smart contract codes each executed by a different blockchain are able to access the same LAMR 100, and/or are loaded into the same LAMR 100 from the same or different VAMRs 102 (e.g., an independent VAMR per blockchain).

* An optional VAMR token (may also be referred to as DAPP token) dataset 130 stores an indication of VAMR tokens used to acquire rights to store data on VAMR 102, as described herein. Token dataset 130 may be stored by one or more VSP nodes 118 and/or one or more blockchain nodes and/or other servers. Token dataset 130 may be stored, for example, per VSP node and/or per blockchain node and/or centralized for use by multiple VSP nodes and/or multiple blockchain nodes.

It is noted that VSP node 118 and computing device 122 may be implemented as distinct devices (i.e., two unique hardware devices), as distinct virtual machines (e.g., both running as unique virtual machines on a common physical device), and/or as a single machine (e.g., a single device executes the features of VSP 118 and computing device 122).

VSP node 118 and/or computing device 122 may contribute at least some of data storage devices(s) 102A for hosting VAMR 102.

Client terminal(s) 110 and/or VSP node(s) 118 and/or blockchain node(s) 122 may be implemented as, for example, a mobile device, a stationary device, a desktop computer, a server, a smartphone, a laptop, a tablet computer, a wearable computing device, a glasses computing device, a watch computing device, a computing cloud, a virtual machine, and a virtual server.

Optionally, an existing server (and/or other network connected computing device) may be set-up as a VSP node. Optionally, VSPs maintain autonomy over aspects of their operation (e.g., complete autonomy over all aspects of operation). Each VSP may offer one or multiple customized data packages accompanied by predefined terms determined by the VSP, as described herein. VSPs may be incentivized by the DAPP token inflation, as described herein.

VSP 118 may denote the standard API endpoint of blockchain 106.

Each of client terminal(s) 110 and/or VSP node(s) 118 and/or blockchain node(s) 122 includes a respective processor 132A-C that executes respective code stored in a respective memory 134A-C (and/or other data storage device). Processor(s) 132A-C may be implemented as, for example, central processing unit(s) (CPU), graphics processing unit(s) (GPU), field programmable gate array(s) (FPGA), digital signal processor(s) (DSP), application specific integrated circuit(s) (ASIC), customized circuit(s), processors for interfacing with other units, and/or specialized hardware accelerators. Processor(s) 132A-C may be implemented as a single processor, a multi-core processor, and/or a cluster of processors arranged for parallel processing (which may include homogenous and/or heterogeneous processor architectures).

Respective memories 134A-C may be implemented as, for example, a hard drive, a random access memory (RAM), read-only memory (ROM), an optical drive, an external storage device, and/or other storage devices. It is noted that processor(s) 132A-C may be designed to implement in hardware one or more features that would otherwise be stored as code instructions by respective memories 134A-C.

Each of client terminal(s) 110 and/or VSP node(s) 118 and/or blockchain node(s) 122 may include a respective data storage device 136A-C that stores data. For example, data storage device 136A of client terminal(s) 110 stores dApp 112, data storage device 136B of VPS node 118 may store blockchain 106 and/or token dataset 130, and data storage device 136C of blockchain node(s) 122 may store blockchain 106, and/or token dataset 130 and/or the blockchain hosting VAMR management contract 128. Data storage devices 136A-C may be implemented as, for example, a random access memory (RAM), read-only memory (ROM), non-volatile memory, magnetic media, semiconductor memory devices, hard drive, removable storage, optical media (e.g., DVD, CD-ROM), a remote storage server, and a computing cloud. It is noted that some data and/or code may be stored in respective data storage devices with executable portions loaded into respective memories.

Network 108 may be implemented, for example, as one or more of: a wire based network (e.g., Ethernet), a wireless based network, the internet, a local area network, a wide area network, a virtual private network, a virtual network, a cellular network, a short range wireless network, a mesh network, and an ad-hoc network. Network 108 may be implemented using one or more protocols and/or network architectures.

Each of client terminal(s) 110 and/or VSP node(s) 118 and/or blockchain node(s) 122 may include respective user interfaces 138A-C that presents data to a user and/or includes a mechanism for entry of data, for example, one or more of: a touch-screen, a display, a keyboard, a mouse, voice activated software, and a microphone.

Each of client terminal(s) 110 and/or VSP node(s) 118 and/or blockchain node(s) 122 may include a respective network interface (not shown) for communicating with network 108, for example, physical and/or virtual components, for example, one or more of, antenna(s), network interface card(s), a wire port, a virtual interface implemented in software, network communication software providing higher layers of network connectivity, an application programming interface (API), a software development kit (SDK), and/or other implementations.

Figure 2:
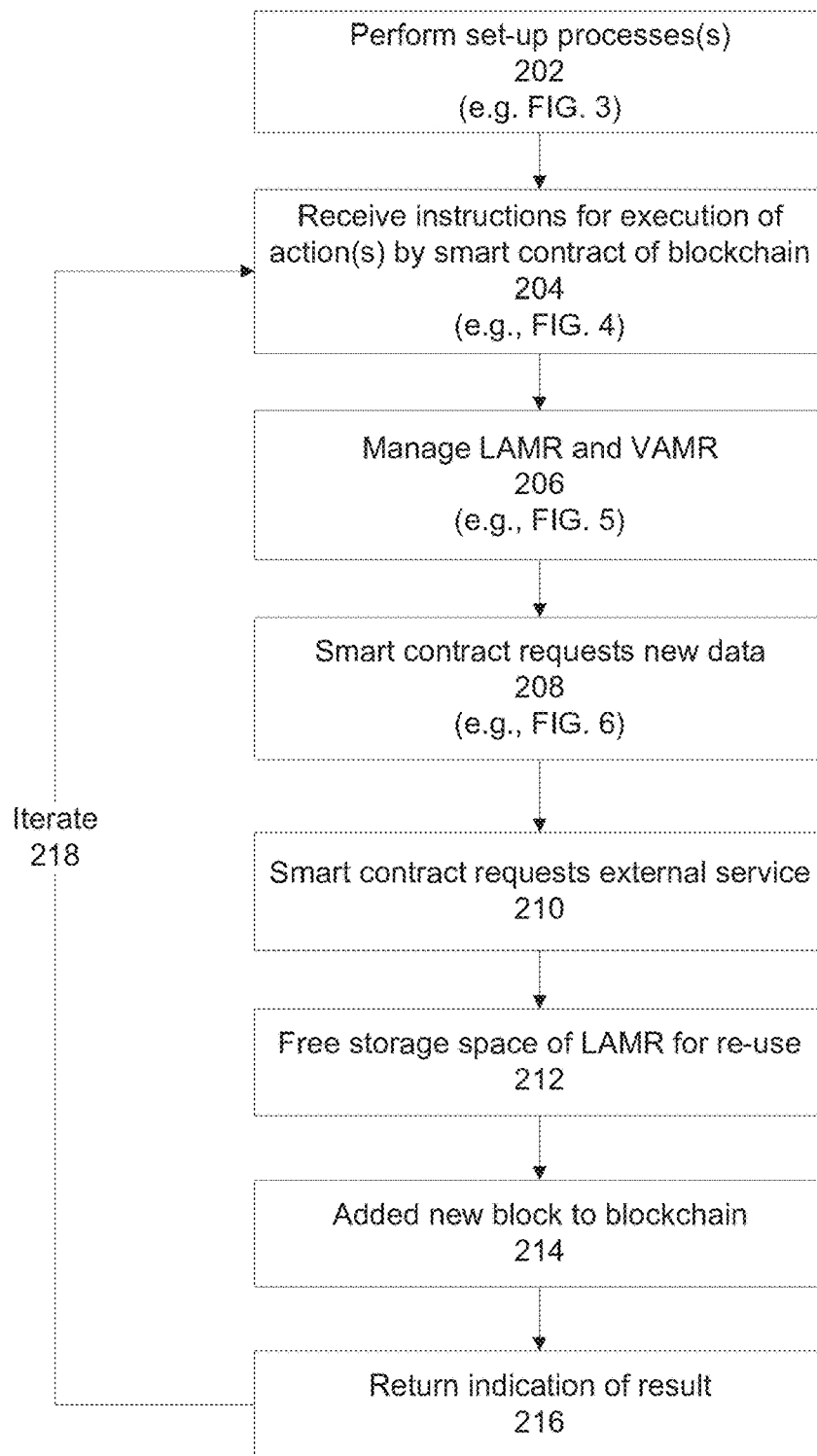
FIG. 2 is a flowchart of a process for managing the LAMR and VAMR for execution of action(s) by a blockchain storage system, in accordance with some embodiments of the present invention.

Reference is now made to FIG. 2, which is a flowchart of a process for managing the LAMR and VAMR for execution of action(s) by a blockchain storage system, in accordance with some embodiments of the present invention.

At 202, one or more setup processes are performed, and/or updates are performed. Exemplary setup and/or update processes are described with reference to FIG. 3.

At 204, instructions for execution of one or more actions by a smart contract of the blockchain dataset storage system are received. The instructions, which are created for being provided to the blockchain dataset storage system, are instead received by the VSP node (also referred to herein as gateway service node). The VSP node acts as a proxy to the blockchain dataset storage system.

The instructions are received from a client terminal, optionally from a dApp executing on the client terminal and/or dApp accessed by the client terminal.

The VSP node may analyze the instructions to determine whether data is required to perform the actions. When data is required, the VSP node may determine if the data is expected by the smart contract to be found in the LAMR, and/or provided by an external service (e.g., server, process, computing device).

The VSP node generates instructions for identifying the data for execution of the action(s) in the LAMR by the smart contract of the blockchain storage system.

The data may be raw data, for example, a sequence of numbers, code, script binary code, text, maps, tuples, vectors, trees, graphs, serialized typed data, indexes, and combinations of the aforementioned.

An exemplary process for processing the instructions by the VSP node is described with reference to FIG. 4.

At 206, the LAMR storing data used by smart contract code of the LAMR based blockchain dataset is managed in association with the VAMR, optionally triggered by the instructions generated by the VSP node. Data is copied between the LAMR and the VAMR as described herein. An exemplary process for managing the LAMR and VAMR is described with reference to FIG. 5.

The blockchain storage system defines the LAMR as having a predefined fixed amount of global memory resources for use by all smart contract codes stored on the blockchain storage system. The LAMR defines storage space for storing data for each of the smart contracts stored in the blockchain storage system.

The VAMR is expandable by inclusion of additional storage devices, having potentially a very large amount and/or infinite potential. The VAMR may be implemented as off-line storage, for example, hard drives, optical drives, storage clouds, storage servers, and/or other implementations. The VAMR may be is implemented as virtual storage distributed across multiple network connected storage devices. The virtual implementation of the VAMR may be accessed by multiple blockchain storage nodes of the blockchain storage system.

At 208, a request to obtain new data element(s) is provided by the smart contract code using the LAMR to the gateway service node (i.e., VSP node). The request to obtain the data element may be triggered by the performance of the action(s) by the smart contract code, optionally using the data stored in the LAMR. The request to obtain new data element(s) may be required by the smart contract code for performing the action(s). The new data element may be used to update the data stored in the LAMR and/or the VAMR.

Exemplary new data elements include: dynamic data (e.g., data that varies with time), indeterminate data (e.g., a random number), a data element randomly selected from a set of data elements, and data obtained from another blockchain dataset.

An exemplary process of requesting new data by the smart contract, obtaining the new data by the VSP node, and processing of the new data element by the smart contract code, is described with reference to FIG. 6.

At 210, the smart contract code using the LAMR generates a request to perform an external service on an external server (and/or external process and/or external computing device). The external service may be a requirement associated with the action(s), for example, to be performed before executing the action(s), to be performed simultaneously with execution of the action(s), to be performed after execution of the action(s), and/or to be performed independently of execution of the action(s).

Optionally, the smart contract does not require feedback from the external service, for example, no data and/or no indication that the external service succeeded.

Optionally, no data is provided back to the smart contract for storage on the blockchain in response to execution of the external service. Optionally, the external service is a 'fire and forget' service, where no block is expected (e.g., by the gateway, by a filter, by a security mechanism).

The request may be provided to VSP node(s) 118, which may act as a gateway for accessing the LAMR and/or VAMR. Alternatively or additionally, the request is provided to the blockchain storage system node 122, which may be executing code for acting as the gateway.

Exemplary requests include external logging, and/or external notification.

The request may be provided via an interface for communication between the smart contract, or the blockchain storage system node executing the smart contract, and the gateway, for example, an API.

The gateway generates instructions for execution of the request to perform the external service on the external server. The request to perform the external service may be executed by the external server.

Optionally, action is performed by the blockchain storage system using the copy stored in the LAMR independently of execution of the request to perform the external service by the gateway service node.

Optionally, the gateway is responsible for monitoring for successful execution of the external service by the external server, for example, monitoring for a message from the external server indicating successful completion of the service. The gateway may send additional requests to the server and/or to other servers in an effort to obtain an indication that the service was successfully completed.

Optionally, no data is provided to the blockchain storage system in response to execution of the request, and/or no indication of success or failure of completion of the request is provided to the blockchain storage system.

At 212, the storage space of the LAMR used by the updated copy is freed-up. The updated copy of the requested data stored in the LAMR may be removed for re-use for storage of new data. As used herein, the term remove or freed-up may refer to, for example, active deletion of data, flagging the data for future deletion (e.g., by a cleanup process), and/or passive deletion of data, i.e., flagging the data for overwrite by new data.

The updated copy of the requested data stored in the LAMR may be removed after storing the updated stored copy in the VAMR.

Optionally, the removal of the updated copy from the LAMR is performed after a predefined time interval has elapsed, without receiving another request for identifying the same updated copy of the requested data stored in the LAMR for execution of another action.

At 214, the updated stored copy and new cryptographic proof are added as a new block of the blockchain storage system. An indication of the new block is distributed over the network to other nodes hosting the blockchain storage system for local update of respective locally stored copies of the blockchain storage system.

At 216, an indication of successful execution of the action(s) by the blockchain storage system and/or successful update of the stored copy in the VAMR and/or successful creation and distribution of the new block is providing to a server over a network, for example, to the VSP node acting as a gateway and/or communicating with client terminal executing the dApp.

At 218, one or more features described with reference to 204-216 are iterated, for example, to perform additional actions by the same smart contract and/or to perform actions by other smart contracts.

Figure 3:
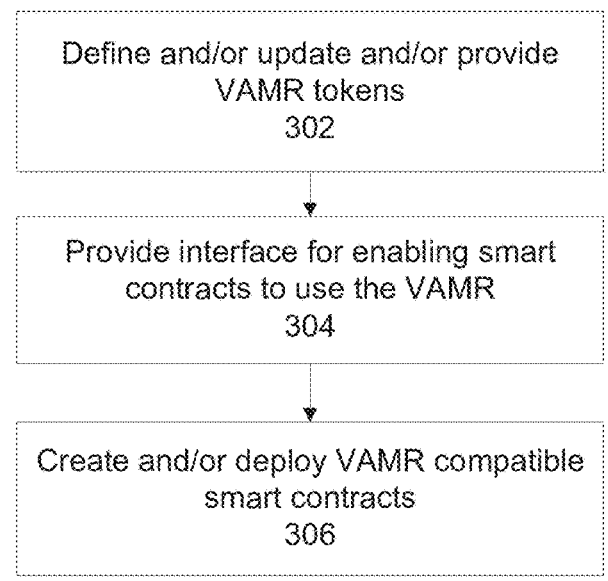
FIG. 3 is a flowchart of an exemplary set-up process, in accordance with some embodiments of the present invention.

Reference is now made to FIG. 3, which is a flowchart of an exemplary set-up process, in accordance with some embodiments of the present invention.

At 302, optionally, VRAM tokens (may also be referred to as DAPP tokens) are defined and/or the status of the available VRAM tokens is updated, for example, indicative of trades in VRAM tokens, issuance of new VRAM tokens, removal of VRAM tokens, and/or amount of VRAM token per user and/or per smart contract.

Optionally, a VAMR token storage dataset (e.g., 130) stores an amount of VAMR tokens in association with the blockchain storage system. The VAMR tokens define an amount of storage space of the VAMR available to the blockchain storage system. The VAMR tokens define the amount of storage space available to each smart contract stored on the blockchain storage system for storage of data for execution of action(s) and/or for storing the updated stored copy (as described herein).

The VAMR tokens are used for loading the data from the LAMR to the VAMR in a decentralized and trustless manner, as described herein. The VAMR serves as the application access token to the VAMR, enabling access of and/or use of read and/or write functionality to the VAMR. The VAMR token does not necessarily grant additional rights. The VAMR token may be enabled on other blockchains. The VAMR token may staked by the dApp developer in order to enable the dApp to use the VAMR.

The VAMR usage of dApps and/or smart contracts may be monitored (e.g., manually by users and/or automatically by code) to determine likelihood that the amount of VAMR tokens is insufficient, or is predicted to likely be insufficient. Additional VAMR tokens and/or upgrades of VSP service packages may be required to avoid service interruptions due to insufficient service plans. VSPs may offer customized service packages (e.g., referred to as VSP service packages) that include, for example, the amount of storage space offered for use, servers' specifications, and/or the corresponding amount of VAMR Tokens that are staked in order to use each package.

Optionally, the VAMR tokens are managed by code 128, optionally virtual cache smart contract 128.

Optionally, VAMR tokens are provided on a pro-rata basis for the VAMR based services provided by one or more of: VSP nodes 118, blockchain storage system node 122, and/or data storage device 102A.

Example parameters of the VAMR tokens (i.e., DAPP tokens) include: symbol for example, DAPP, VAMR, vRAM; supply for example, 1 billion tokens (or other value), and tokens may be transferrable as soon as distribution begins.

A relay token may be defined between VAMR tokens and other tokens of LAMR based blockchain systems.

VAMR tokens may have, for example, a 1% or other value annual inflation rate. The inflation may be allocated as rewards to the VSPs pro-rata in VAMR Token amounts staked and assigned to the corresponding service packages facilitated by the VSPs.

An exemplary distribution (values are examples and other values may be used) of the VAMR tokens is as follows:

50% of the VAMR Tokens may be auctioned in 333 daily sale cycles, managed by a Vendor Smart Contract.

The Vendor Smart Contract offers 1,501,501 DAPP Tokens per day (a 24 hour cycle) (the "Daily Quota").

Participants send tokens of the LAMR based blockchain storage system to the Vendor Smart Contract to purchase the VAMR Tokens sold in a specific daily cycle.

By the end of each daily cycle:

i. The Daily Quota of DAPP Tokens is distributed to the daily Participants—pro-rata to the amounts sent.

ii. The Vendor Smart Contract sends the tokens of the LAMR based blockchain storage system to a VAMR Token Issuer.

For example: Daily Quota: 1,501,501 DAPP Tokens. Total LAMR based blockchain tokens received in that daily cycle: 10,000. Participant A sent an amount of 1,000 LAMR based blockchain tokens, meaning at the end of the daily cycle Participant A received 1,000/10,000*1,501,501=150, 150.1 DAPP Tokens.

20% of the VAMR Tokens will be "Air-HODL" (a vested airdrop) to the LAMR based blockchain storage system community. Upon the start of the first daily sale cycle of DAPP Tokens, every LAMR based blockchain token holder on the Genesis block will be allocated DAPP Tokens on a pro-rata basis (up to a maximum of 3 million LAMR based blockchain token) ("Pioneer Holders"). The amount of DAPP Tokens received by Pioneer Holders will continuously vest (on a block-by-block basis) over a period of 2 years, so that complete withdrawal of funds will be possible after 2 years. Any Blessed Holder choosing to withdraw the Air-HODL-ed tokens before the end of the 2 years will only receive the vested portion (e.g. 25% of the allocation after 6 months). Any Blessed Holder choosing to release (and\or sell) the Air-HODL-ed tokens before they are fully vested contributes the remaining unvested DAPP Tokens to those who are still holding their Air-HODL tokens, increasing the allocation for those users. However, Pioneer Holders can stake their vested DAPP Tokens in Smart DAPP Contracts, and by doing so, those Air-HODLed tokens will not be considered withdrawn.

30% of the VAMR tokens will be allocated to the VAMR Token Issuer, with about 7.5% unlocked and the rest continuously vested (on a block-by-block basis) over a period of 3 years. However, unvested tokens may be staked.

At 304, an interface for enabling smart contract to use the VAMR is defined and/or provided for use by smart contracts. The interface may be implemented as, for example, a library file, code, a script. The interface enables the smart contract to read and/or write in the same programmatic interfaces as RAM tables (e.g., multi-index tables).

At 306, smart contracts, which are compatible with the VAMR by including the interface, are created and/or deployed on the blockchain storage system. The VAMR compatible smart contract (which may also be referred to herein as smart DAPP contract) provides secure VAMR read and/or write access for dApps associated with the blockchain dataset via the VAMR compatible smart contracts. The smart DAPP contract may include the interface code for interfacing with the VAMR, as described herein. The read and/or write ability of the VAMR compatible smart contracts may be defined by the amount of associated VAMR tokens. The smart DAPP contract may interact with code 128 (e.g., virtual cache smart contract), optionally as long at the smart DAPP contract is associated with a sufficient amount of DAPP tokens to support the dApp's VAMR read and/or write demands.

Optionally, in order to gain access to the VAMR System and/pr services (e.g., facilitated by the VSPs), dApp developers may be required to stake DAPP Tokens in the Smart DAPP Contracts. The amount of DAPP Tokens required for each Smart DAPP Contract are at least the applicable amount of DAPP Tokens needed to accommodate the dApp's VAMR read/write needs and optionally may match the selected VSP package requirements. It is noted that the dApp developer may stake more than the minimum amount needed in order to endorse a specific VSP.

A dApp developer may maintain multiple stakes of DAPP Tokens assigned to enable services from different VSPs. For example, to ensure, among other things, service redundancy for potential cases of VSP unavailability.

The DAPP Smart Contract (e.g., issues new DAPP Tokens on an ongoing basis, at an annual inflation rate of about 1% ("Inflation") or other values. The DAPP Smart Contract may allocate the Inflation amount to the VSPs pro-rata to the DAPP Tokens amounts staked and assigned to the corresponding service packages facilitated by the VSPs. The staked amounts may be calculated on an accumulated block-to-block basis, and/or allocation may be executed on a daily cycle basis.

As used herein, the term smart contract refers to the VAMR compatible smart contract and/or the smart DAPP contract.

In one exemplary process, in order to use the VAMR, the following process is followed (e.g., by the develop of the dApp):

1) Integrate the VAMR interface (e.g., Library) to create the dApp Compatible Smart Contracts from which data would be written and/or read from the VAMR.

2) Select the virtual server provider (VSP) service package(s) that satisfy the initial dApp data storage and access needs.

3) Acquire VAMR Tokens in the applicable amount to accommodate for the required data storage and access needs.

4) Stake the VAMR Tokens in the dApp VAMR Compatible Smart Contract through the VAMR Library, assigning the staked tokens to the specific selected VSP data storage and access package(s).

In order to gain access to the VAMR system and/or services (e.g., facilitated by the VSPs and/or blockchain storage system nodes 122), dApp developers may be required to stake VAMR Tokens in the VAMR Compatible Smart Contracts. The amount of VAMR Tokens required in each VAMR Compatible Smart Contract to support the dApp's read and/or write demands is to be sufficient.

Multiple stakes of VAMR Tokens may be maintained by the same dApp developer (e.g., or other user) to enable services from different VSPs. The multiple stakes of VAMR tokens may be to ensure service redundancy for potential cases of VSP unavailability. Alternatively, VAMR tokens are centrally stored for use by multiple VSPs.

Figure 4:
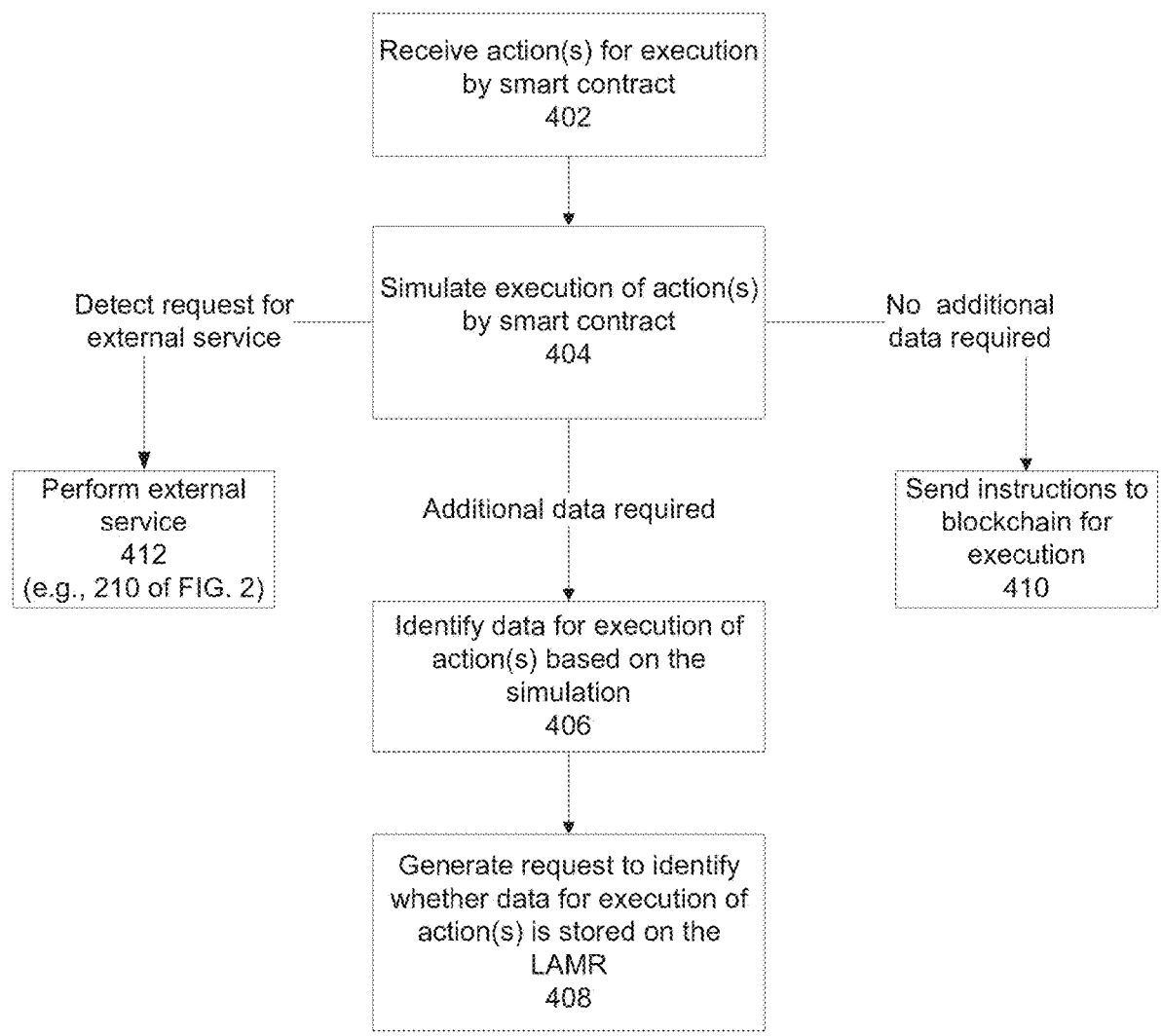
FIG. 4 is a flowchart of an exemplary process for processing instructions for execution of action(s) by the smart contract code, in accordance with some embodiments of the present invention.

Reference is now made to FIG. 4, which is a flowchart of an exemplary process for processing instructions for execution of action(s) by the smart contract code, in accordance with some embodiments of the present invention. The features of FIG. 4 may be implemented, for example, by VP node 118 based on instructions received from client terminal 110 and/or dApp 112.

At 402, the action(s) for execution by the smart contract is received from the client terminal by gateway service node (i.e., VSP node), which may be acting as a proxy for the blockchain storage system.

At 404, the VSP node simulates the action(s). The action(s) may be simulated by running the smart contract of the blockchain associated with the action(s) and that optionally stores data on the VAMR.

At 406, data for execution of the action(s) is identified based on the simulation. The data may be identified by a failure of execution of the action(s) by the smart contract. The smart contract may generate an indication of the data and/or external service that is required to perform the action(s), for example, data which may be currently stored on the LAMR, data stored on the VAMR (but not currently stored on the LAMR), and/or new data obtained from an external service (e.g., as described herein).

The data may be identified by the smart contract code as unavailable, for example, when the data for execution of the action(s) is stored on the LAMR and is unavailable during the simulation, since the simulation cannot access the LAMR. In another example, the data for execution of the action(s) may be provided by an external server, and is therefore unavailable during the simulation. It is noted that an exemplary process for obtaining data from the external server is described with reference to act 208 of FIG. 2.

At 408, a request to identify whether the data for execution of the action(s) is stored on the LAMR is generated by the VSP.

At 410, alternatively to 408, when the simulation results indicate that no additional data is required by the smart contract, the VSP may provide the originally received instructions (e.g., transaction) to the blockchain node, for execution. The VSP node may returns results of the blockchain node to the client terminal (e.g., acting as proxy to the blockchain node).

At 412, alternatively to 404 and 410, when the simulation results indicate that the smart contract code triggers a request for an external service (i.e., doesn't fail), the gateway service node may proceed to perform the external service, as described with reference to act 210 of FIG. 2.

Figure 5:
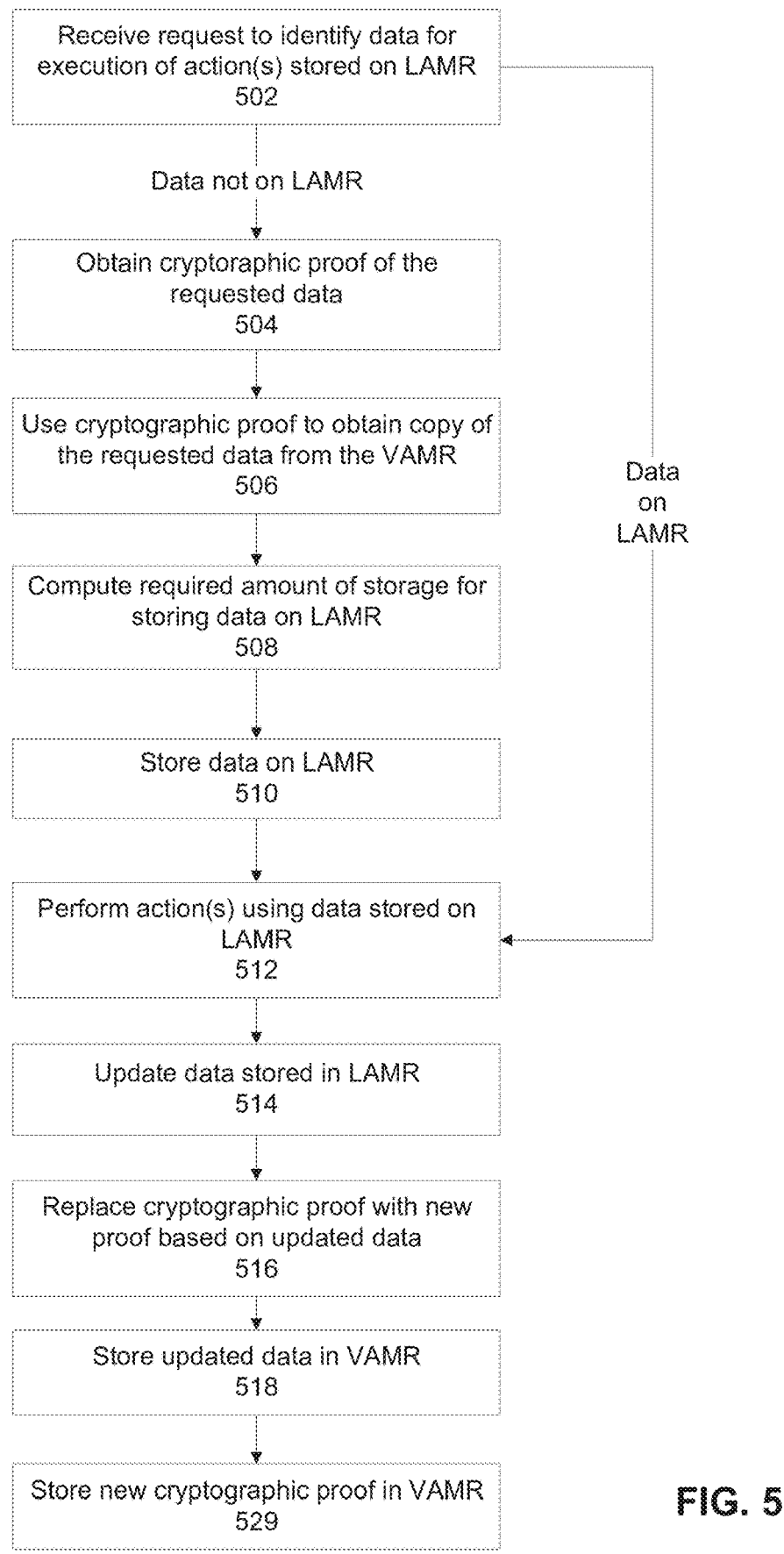
FIG. 5 is a flowchart of a process for managing the LAMR and VAMR, in accordance with some embodiments of the present invention.

Reference is now made to FIG. 5, which is a flowchart of a process for managing the LAMR and VAMR, in accordance with some embodiments of the present invention. The process of FIG. 5 may be implemented, for example, by one or more of: blockchain storage system node 102 communicating with VSP node 118 and LAMR 100 and VAMR 102 (stored on data storage device(s) 102A.

At 502, a request to identify data for execution of action(s) stored on the LAMR of the blockchain storage system, is received.

The request may be received from a server over a network, for example, the VSP node interfacing with the client terminal executing the dApp. The VSP node may create the request in response to instructions received via a software interface, from the dApp. The dApp is associated with the blockchain storage system, which may be accessed by a network connected client terminal.

The action may be, for example, a transaction.

Exemplary the data for execution of the action includes: code components of a smart contract code stored on the blockchain storage system (e.g., the smart contract code associated with the dApp), a temporary cache used by the blockchain storage system for reading data and writing new data, cryptographic keys, states of the smart contract, state of the dApp, network addresses, and account information of users of the dApp associated with the blockchain storage system.

The data is for execution of action(s) by the smart contract code stored on the blockchain storage system. The smart contract code is associated with the dApp that originally provided instructions that triggered execution of action(s) by the smart contract code.

At 504, when the requested data is not found in the LAMR, a cryptographic proof of the requested data is acquired from the LAMR. The cryptographic proof may be stored in a cryptographic signature repository stored on the LAMR. The cryptographic signature repository stores a cryptographic signature computed for each of the data items used for execution of action(s) by the blockchain storage system.

A portion of the LAMR may be designated for storage of the cryptographic proofs. Data for execution of the action(s) by the blockchain storage system may not be stored in the cryptographic repository.

Example implementations of cryptographic proof include: hash of the data computed by a hash function, a Merkel proof for verifying a portion of the data (e.g., the smart contract), other forms of cryptographic signing that may be used to validate the authenticity of the data.

The blockchain storage system (optionally the smart contract) may include the code for validating the data obtained from the VAMR.

At 506, the cryptographic proof is used for acquiring a copy of the requested data from the VAMR.

Each cryptographic proof may be mapped to the copy of the requested data, for example, via a mapping dataset and/or saved inside data itself and/or the cryptographic proof is itself the pointer to the data. For example, the cryptographic proof may be used as a look-up for identifying the associated requested data.

Optionally, the cryptographic proof (e.g., hash) servers as the canonical id (e.g., pointer) to the data. The cryptographic proof (i.e., signature) saved inside the smart contract may serve as a pointer to the data, in addition to serving as the signature for validation of the data. The data is fetched from the VAMR using the cryptographic proof as pointer and/or by computing the pointer from the cryptographic proof.

By using the cryptographic proof as a pointer to the location of the data in the VAMR, the node (e.g., VSP) that fetches the data from the VAMR doesn't necessarily require the entire history of the blockchain to compute the location of the data that the contract is requesting.

The cryptographic proof may be validated against a cryptographic signature of the requested data stored on the VAMR, for acquiring the copy of the requested data from the VAMR. For example, the cryptographic signature is computed for the requested data stored in the VAMR, and compared to the cryptographic proof obtained from the cryptographic signature. The validation may be performed, for example, by one or more of: the data storage device hosting the VAMR, the VSP node, and/or the blockchain storage system node.

At 508, an amount of storage space required for storing the data for execution of action(s) in the LAMR may be computed. A suitable amount of the required storage space is identified in the LAMR. The suitable amount of storage space may include vacant space in the LAMR, and/or the storage space of the LAMR associated with a flag indicative of overwrite permission.

At 510, the copy of the requested data is stored in the LAMR. The copy of the data may be copied to the identified vacant space and/or space flagged with overwrite permission.

At 512, the action(s) is performed by the blockchain storage system using the copy stored on the LAMR.

Optionally, the action(s) for execution is provided to the smart contract, optionally via the VSP node. The providing of the instructions of the actual action for execution may be triggered in response to an indication that the copy of the data for performing the action(s) is successfully loaded into the LAMR, for example, by the smart contract providing the indication to the VSP node. The action(a) are performed using the copy stored on the LAMR.

It is noted that when the data is already stored on the LAMR (e.g., data has not been overwritten by other data, data was placed there by a prior execution of the same action and/or another action), execution of 512 may follow 502, skipping 504-510.

At 514, the performance of the action(s) may update the stored copy in the LAMR.

At 516, the cryptographic proof (stored in the cryptographic signature repository) is replaced with a new cryptographic proof created by processing the updated copy stored in the LAMR.

The blockchain storage system (optionally the smart contract) may include the code for computing the new cryptographic proof (e.g., new signature, new expected hash).

At 518, the updated stored copy is stored in the VAMR. When the action is a transaction, the updated stored copy may be a record of the transaction including details of the transaction.

At 520, the new cryptographic proof may be stored in the VAMR in association with the updated stored copy stored in the VAMR.

Figure 6:
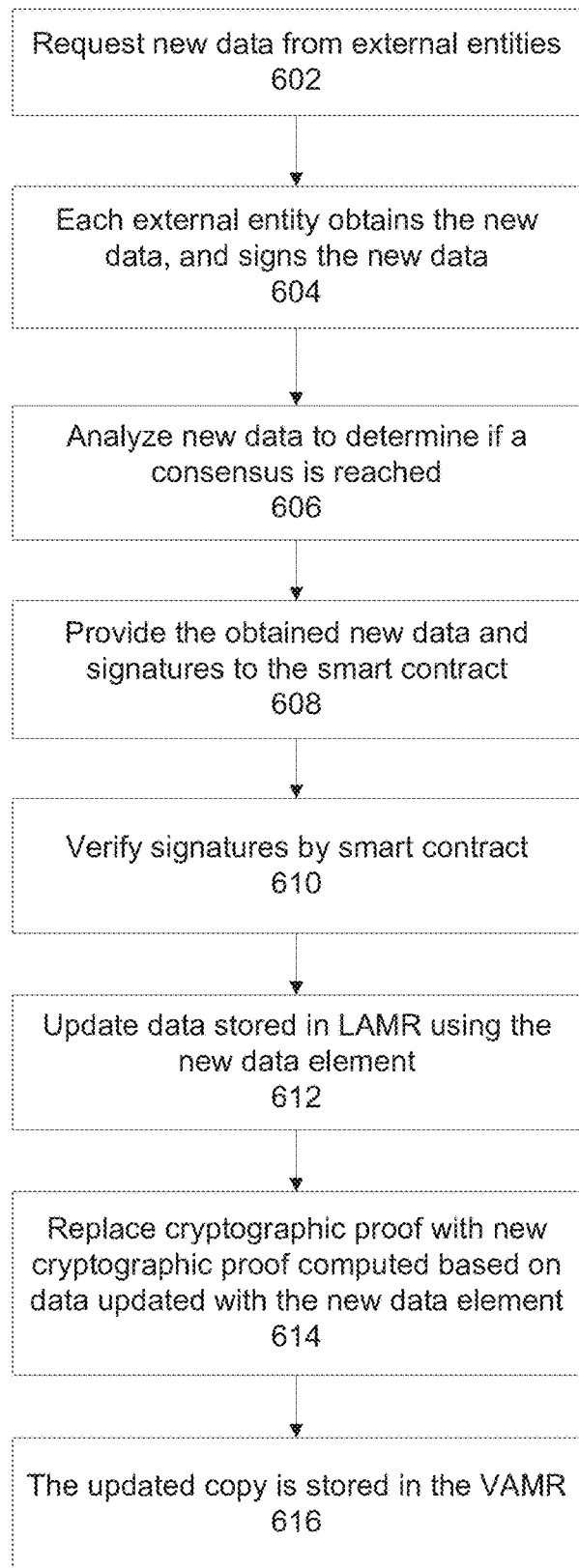
FIG. 6 is a flowchart of an exemplary process for obtaining one or more new data elements in response to a request by the smart contract, in accordance with some embodiments of the present invention.

Reference is now made to FIG. 6, which is a flowchart of an exemplary process for obtaining one or more new data elements in response to a request by the smart contract, in accordance with some embodiments of the present invention. The process of FIG. 6 may be implemented, for example, VSP node 118, blockchain storage system node 102 (including LAMR 100, code 128, blockchain 106), VAMR 102, and external entities 150.

At 602, the gateway service node requests the one or more new data elements from multiple external entities (e.g., external servers and/or external processes (e.g., web API) and/or external computing devices (also referred to as oracles and/or witnesses)). For example, data that varies with time may be obtained from a real-time server. For example, a weather server providing time related weather data, a current time server providing the current time, a stock market server providing real time quotes of stocks and/or other financial instruments, a currency server providing real time exchange rate quotes of FIAT currency and/or cryptocurrency, a government server providing real time demographic data (e.g., population, income), a random number generated by a random number generating process, a data element randomly selected from a set of data elements by the external process, and data obtained from another blockchain dataset.

At 604, each of the external servers (and/or processes and/or computing devices and/or oracles and/or witnesses) independently obtains the new data element(s). Each of the external servers (and/or processes and/or computing devices and/or oracles and/or witnesses) independently signs its respective new data element(s) with its respective private key, to create a respective signature.

In the case of a request for a random number, each external servers (and/or processes and/or computing devices and/or oracles and/or witnesses) may generate its own random number and an associated signature. The final random number that is provided to the smart contract code is computed as an aggregation based on the multiple random numbers, for example, an average and/or sum and/or multiplication of the random numbers and/or hash thereof.

At 606, optionally, the data obtained by the external servers (and/or processes and/or computing devices and/or oracles and/or witnesses) is analyzed to determine whether a consensus is reached, of at least a predefined percentage and/or number of the external servers (and/or processes and/or computing devices and/or oracles and/or witnesses) that obtained the same value for the one new data element(s). The consensus may be, for example, a majority, a predefined percentage (e.g., at least 60%, or 75%, or 80%, or 90%), and/or a predefined number (at least 3, 5, 10, or other values).

At 608, the new data element(s) and associated signature of each of the external servers (and/or processes and/or computing devices and/or oracles and/or witnesses) is provided to the smart contract of the LAMR. The smart contract may be provided with multiple copies of the new data element, from each of the external servers that reached the consensus. Each copy of the new data element is associated with the signature computed by the respective external server (and/or processes and/or computing device and/or oracle and/or witnesses).

At 610, the associated signatures and optionally the consensus are verified by the smart contract of the LAMR.

At 612, the new data element(s) is used to updates the stored copy in the LAMR. For example, the new data element(s) may be included in additional to the existing stored copy, used to compute a new value for the stored copy, replacing part or all of the stored copy, or using other processes to update the stored copy.

At 614, the cryptographic proof is replaced with a new cryptographic proof created by processing the stored copy updated with the new data element(s) stored in the LAMR.

At 616, storing the copy updated with the at least one data element in the VAMR.

The acts of the methods described with reference to FIG. 6 may be implemented for example, for performing hiding of data and then showing the data, such as hidden shuffle, hidden distribute, for example, for playing a game of poker. The game of poker may be implemented, as for example, using the following process based on FIG. 6: Shuffling and distributing a deck of cards. Encrypting the deck and/or each hand with a temporary key. Writing the random seed and entire game state encrypted on the blockchain (e.g., stored in the VAMR) for later retrieval for resuming the game. When the game is resumed, proof is computed that each player is provided with the respective hand. For example, each hand is encrypted with each player's respective public key. Each player may open their own encrypted hand with their own private key. Additional cards may be distributed during the round (depending on the type of poker). The cards and random seed may be revealed (e.g., by revealing the temporary private key) to everyone in the end of the round so the smart contract may calculate the winner. Another layer of trust may be added by choosing the random seed collectively using the mechanism in which multiple servers independently obtain the new data.

Figure 7:
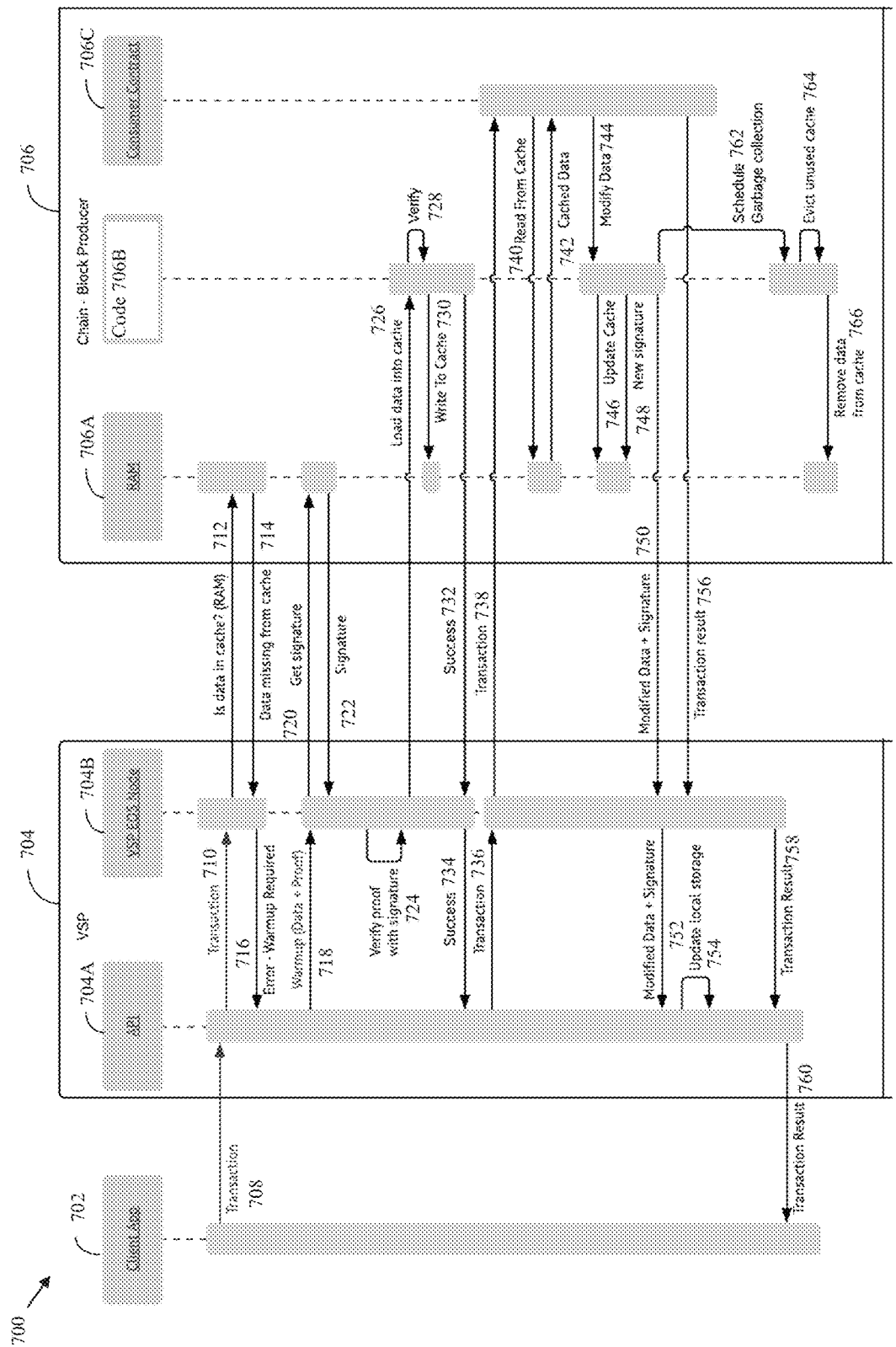
FIG. 7 is a dataflow diagram depicting exemplary dataflows for managing a LAMR and VAMR storing data for execution of action(s) by smart contract code of a blockchain storage system, in accordance with some embodiments of the present invention.

Reference is now made to FIG. 7, which is a dataflow diagram 700 depicting exemplary dataflows for managing a LAMR and VAMR storing data for execution of action(s) by smart contract code of a blockchain storage system, in accordance with some embodiments of the present invention. The dataflow of dataflow diagram 700 may be implemented by components of system 100 described with reference to FIG. 1. The dataflow of dataflow diagram 700 may be based on, and/or include, and/or be modified, according to flowcharts described with reference to FIGS. 2-6.

Dataflow diagram 700 depicts dataflow between the following components:

* Client App 702, which may be implemented as, for example, client terminal 110 and/or dApp 112.
* VSP node 704 (which may be implemented as VSP node 118), which includes API 704A (e.g., code 120), and VSP EOS node 704 (e.g., code 120).
* Blockchain storage node 706 (e.g., 122), which includes RAM 706A (e.g., LAMR 100), code 706B (e.g., code 128), and consumer contract 706C (e.g., smart contract 104).

At 708, a transaction (or other instructions for performing an action) is provided by client app 702 to API 704A.

At 710, the transaction is analyzed (e.g. simulated).

At 712, when the simulation indicates that additional data is required, a request to identify whether the data is in LAMR 706A is sent to blockchain node 706.

At 714, an indication that the data is not in LAMR 706A is sent from node 706 to VSP 704.

At 716, an error is generated.

At 718 and 720, a request to obtain the cryptographic signature from the LAMR is provided to node 706. The cryptographic signature stored in the LAMR is used to locate the data in the VAMR.

At 722, the cryptographic signature is obtained from the LAMR and provided.

At 724, the cryptographic signature obtained from the LAMR is used to obtain the data from the VAMR.

At 726, the data from the VAMR is provided to node 706.

At 728, the data from the VAMR is verified using the cryptographic proof in the LAMR 706A.

At 730, the data from the VAMR is loaded into the LAMR 706A.

At 732 and 734, an indication of successful loading of the data into the LAMR 706A is provided to VSP 704.

At 736 and 738, the transaction is provided to smart contract 706C for execution.

At 740 and 742, smart contract uses the data stored in LAMR 706C to perform the transaction.

At 744 and 746, execution of the transaction results in a modification of the data stored in LAMR 706C.

At 748, a new cryptographic signature is computed based on the modified data.

At 750 and 752, the modified data and new cryptographic signature are provided to VPS 704.

At 754, the modified data and new cryptographic signature are stored in the VAMR.

At 756 758 and 760, an indication of successful execution of the transaction is provided to client app 702 via VSP 704 acting as a proxy to blockchain node 706.

At 762, a scheduled garbage collection process is triggered.

At 764, unused data stored in LAMR 706A is evicted.

At 766, the unused data is removed from LAMR 706A, freeing up the storage space for use by other data associated with other transactions and/or other smart contracts.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant LAMR based blockchain storage systems will be developed and the scope of the term LAMR based blockchain storage system is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for managing a limited allocated memory resource (LAMR) storing data used by a smart contract code of a plurality of smart contracts of a LAMR-based blockchain dataset stored in a blockchain storage system, wherein the LAMR defines storage space for storing data for each of the plurality of smart contracts, the system comprising:
   at least one hardware processor of the blockchain storage system executing a code for:
   receiving, from a client terminal by a gateway service node, a request for performing at least one action by the smart contract code stored in the blockchain storage system, wherein the gateway service node acts as a proxy for the blockchain storage system;
   simulating, by the gateway service node, the request to perform the at least one action to determine whether the smart contract code requires data for performing the at least one action;
   based on the simulation that performing the at least one action requires data, providing, by a gateway service node to the blockchain storage system, a request to identify the data for execution of the at least one action in the LAMR of a blockchain storage system;
   when the requested data is not found in the LAMR by the blockchain storage system, providing by the blockchain storage system to the gateway service node, an indication that the requested data is not found in the LAMR, wherein in response to the indication the gateway service node acquires a cryptographic proof of the requested data from the LAMR of the blockchain storage system;
   wherein the cryptographic proof is used by the gateway service node for acquiring a copy of the requested data from a virtual allocated memory resource (VAMR);
   providing the copy of the requested data to the blockchain storage system;
   storing, by the blockchain storage system, the copy of the requested data in the LAMR for performing the at least one action by the blockchain storage system using the stored copy, the performance of the at least one action updates the stored copy in the LAMR;
   performing, by the smart contract code, the at least one action using the stored copy to produce an updated stored copy;
   replacing, by the blockchain storage system, the cryptographic proof with a new cryptographic proof created by processing the updated stored copy in the LAMR; and
   providing, the updated copy by the blockchain storage system to the gateway storage system, for storing the updated stored copy in the VAMR.

2. The system according to claim 1, wherein the at least one action is simulated by running the smart contract code of the blockchain associated with the at least one action and that stores data on the VAMR, wherein the smart contract code is stored on the blockchain storage system.

3. The system according to claim 1, further comprising:
   transmitting a request to a gateway service node, by the smart contract code of the LAMR, to obtain at least one new data element,
   wherein the gateway service node requests the at least one new data element from a plurality of external servers,
   wherein each of the plurality of external servers independently obtains a respective at least one new data element, and signs the respective at least one new data element with a respective private key of the respective external server to create a respective signature,
   when a consensus of a predefined number of the plurality of external servers obtaining a same value for the respective at least one new data element is reached, the at least one new data element and associated signature of each of the external servers of the consensus is provided to the smart contract of the LAMR, and further comprising:
   verifying the consensus and associated signatures by the smart contract of the LAMR.

4. The system according to claim 3, wherein the request to obtain the at least one new data element is triggered by the performance of the at least one action, wherein the at least one new data element updates the stored copy in the LAMR.

5. The system according to claim 4, further comprising:
   replacing the cryptographic proof with a new cryptographic proof created by processing the stored copy updated with the at least one data element stored in the LAMR; and
   storing the copy updated with the at least one new data element in the VAMR.

6. The system according to claim 3, wherein the at least new data element is at least one member selected from the group consisting of:
   data that varies with time, a random number, a data element randomly selected from a set of data elements, and data obtained from another blockchain dataset.

7. The system according to claim 1, further comprising:
   transmitting a request to a gateway service node, by the smart contract code of the LAMR, to perform an external service on an external server; and wherein the gateway service node generates instructions for execution of the request to perform the external service on the external server.

8. The system according to claim 7, wherein the at least one action is performed by the blockchain storage system using the copy stored in the LAMR independently of execution of the request to perform the external service by the gateway service node.

9. The system according to claim 1, further comprising at least one of flagging for overwrite and deleting the updated copy of the requested data stored in the LAMR, after storing the updated stored copy in the VAMR.

10. The system according to claim 9, wherein the at least one of flagging for overwrite and deleting is performed after a predefined time interval has elapsed without receiving another request for identifying the updated copy of the requested data stored in the LAMR for execution of another at least one action.

11. The system of claim 1, wherein the blockchain storage system defines the LAMR as having a predefined fixed amount of global memory resources for use by all smart contract codes stored on the blockchain storage system.

12. The system of claim 1, wherein the VAMR is expandable by inclusion of additional storage devices.

13. The system of claim 1, wherein the VAMR is implemented as off-line storage.

14. The system of claim 1, wherein the VAMR is implemented as virtual storage distributed across a plurality of network connected storage devices.

15. The system of claim 1, wherein the cryptographic proof is stored in a cryptographic signature repository stored on the LAMR, the cryptographic signature repository stores a cryptographic signature computed for each of a plurality of data for execution of at least one action by the blockchain storage system.

16. The system of claim 1, wherein the request is received from a server over a network, the server creates the request in response to instructions received via a software interface from a distributed application (dApp) associated with the blockchain storage system accessed by a network connected client terminal.

17. The system according to claim 1, wherein the data for execution of the at least one action is selected from the group consisting of:
code components of a smart contract code stored on the blockchain storage system, a temporary cache used by the blockchain storage system for reading data and writing new data, cryptographic keys, states of the smart contract, state of a dApp, network addresses, and account information of users of a dApp associated with the blockchain storage system.

18. The system according to claim 1, wherein the data is for execution of at least one action by the smart contract code stored on the blockchain storage system.

19. The system according to claim 1, wherein the cryptographic proof is validated against a cryptographic signature of the requested data stored on the VAMR for acquiring the copy of the requested data from the VAMR.

20. The system according to claim 1, further comprising a VAMR token storage dataset storing an amount of VAMR tokens in association with the blockchain storage system, the VAMR tokens defining an amount of storage space of the VAMR available to the blockchain storage system.

21. The system according to claim 20, wherein the VAMR tokens define the amount of storage space available to each smart contract of the plurality of smart contracts stored on the blockchain storage system for storage of data for execution of at least one action and for storing the updated stored copy.

22. The system according to claim 1, further comprising storing the new cryptographic proof in the VAMR in association with the updated stored copy stored in the VAMR.

23. The system according to claim 22, wherein the updated stored copy and new cryptographic proof are added as a new block of the blockchain storage system, and distributing an indication of the new block over the network to other nodes hosting the blockchain storage system for local update of respective locally stored copies of the blockchain storage system.

24. The system according to claim 1, wherein the at least one action comprises a transaction, and the updated stored copy comprises a record of the transaction including details of the transaction.

25. The system according to claim 1, further comprising:
computing an amount of storage space required for storing the data for execution of at least one action in the LAMR,
identifying at least one of: an amount of vacant space in the LAMR, and the amount of storage space of the LAMR associated with a flag indicative of overwrite permission, and
copying the data for execution of at least one action to at least one of the vacant space and overwriting existing data of the LAMR associated with the flag indicative of overwrite permission.

26. The system according to claim 1, further comprising providing to a server over a network, an indication of successful execution of the at least one action and successful update of the stored copy.

27. A computer implemented method for managing a limited allocated memory resource (LAMR) storing data used by smart contract code of a plurality of smart contracts of a LAMR-based blockchain dataset stored in a blockchain storage system, wherein the LAMR defines storage space for storing data for each of the plurality of smart contracts, the computer implemented method comprising:
receiving, from a client terminal by a gateway service node, a request for performing at least one action by the smart contract code stored in the blockchain storage system, wherein the gateway service node acts as a proxy for the blockchain storage system;
simulating, by the gateway service node, the request to perform the at least one action to determine whether the smart contract code requires data for performing the at least one action;
based on the simulation that performing the at least one action requires data, providing, by a gateway service node to the blockchain storage system, a request to identify data for execution of the at least one action in the LAMR of a blockchain storage system;
when the requested data is not found in the LAMR by the blockchain storage system, providing by the blockchain storage system to the gateway service node, an indication that the requested data is not found in the LAMR, wherein in response to the indication the gateway service node acquires a cryptographic proof of the requested data from the LAMR of the blockchain storage system;
wherein the cryptographic proof is used by the gateway service node for acquiring a copy of the requested data from a virtual allocated memory resource (VAMR);
providing the copy of the requested data to the blockchain storage system;

storing, by the blockchain storage system, the copy of the requested data in the LAMR for performing the at least one action by the blockchain storage system using the stored copy, the performance of the at least one action updates the stored copy in the LAMR;

performing, by the smart contract code, the at least one action using the stored copy to produce an updated stored copy;

replacing, by the blockchain storage system, the cryptographic proof with a new cryptographic proof created by processing the updated stored copy in the LAMR; and providing, the updated copy by the blockchain storage system to the gateway storage system, for storing the updated stored copy in the VAMR.

28. A computer program product for managing a limited allocated memory resource (LAMR) storing data used by smart contract of a plurality of smart contracts of a LAMR-based blockchain dataset stored in a blockchain storage system, wherein the LAMR defines storage space for storing data for each of the plurality of smart contracts, the computer program product comprising:

a non-transitory memory stored thereon code for execution by at least one hardware processor of the blockchain storage system, the code including instructions for:

receiving, from a client terminal by a gateway service node, a request for performing at least one action by the smart contract code stored in the blockchain storage system, wherein the gateway service node acts as a proxy for the blockchain storage system;

simulating, by the gateway service node, the request to perform the at least one action to determine whether the smart contract code requires data for performing the at least one action;

based on the simulation that performing the at least one action requires data, providing, by a gateway service node to the blockchain storage system, a request to identify the data for execution of the at least one action in the LAMR of a blockchain storage system;

when the requested data is not found in the LAMR by the blockchain storage system, providing by the blockchain storage system to the gateway service node, an indication that the requested data is not found in the LAMR, wherein in response to the indication the gateway service node acquires a cryptographic proof of the requested data from the LAMR of the blockchain storage system;

wherein the cryptographic proof is used by the gateway service node for acquiring a copy of the requested data from a virtual allocated memory resource (VAMR);

providing the copy of the requested data to the blockchain storage system;

storing, by the blockchain storage system, the copy of the requested data in the LAMR for performing the at least one action by the blockchain storage system using the stored copy, the performance of the at least one action updates the stored copy in the LAMR;

performing, by the smart contract code, the at least one action using the stored copy to produce an updated stored copy;

replacing, by the blockchain storage system, the cryptographic proof with a new cryptographic proof created by processing the updated stored copy in the LAMR; and providing, the updated copy by the blockchain storage system to the gateway storage system, for storing the updated stored copy in the VAMR.

\* \* \* \* \*